US012360519B2

(12) United States Patent
Phalakarn et al.

(10) Patent No.: US 12,360,519 B2
(45) Date of Patent: Jul. 15, 2025

(54) SYSTEM OPTIMAL CONTROL DEVICE, SYSTEM OPTIMAL CONTROL METHOD, AND PROGRAM

(71) Applicant: INTER-UNIVERSITY RESEARCH INSTITUTE CORPORATION RESEARCH ORGANIZATION OF INFORMATION AND SYSTEMS, Tokyo (JP)

(72) Inventors: Kittiphon Phalakarn, Tokyo (JP); Toru Takisaka, Tokyo (JP); Thomas Haas, Tokyo (JP); Ichiro Hasuo, Tokyo (JP)

(73) Assignee: INTER-UNIVERSITY RESEARCH INSTITUTE CORPORATION RESEARCH ORGANIZATION OF INFORMATION AND SYSTEMS, Tokyo (JP)

( * ) Notice: Subject to any disclaimer, the term of this patent is extended or adjusted under 35 U.S.C. 154(b) by 466 days.

(21) Appl. No.: 18/002,155

(22) PCT Filed: Jul. 2, 2021

(86) PCT No.: PCT/JP2021/025164
§ 371 (c)(1),
(2) Date: Dec. 16, 2022

(87) PCT Pub. No.: WO2022/004881
PCT Pub. Date: Jan. 6, 2022

(65) Prior Publication Data
US 2023/0221713 A1   Jul. 13, 2023

(30) Foreign Application Priority Data
Jul. 3, 2020   (JP) .................................. 2020-115973

(51) Int. Cl.
*G05B 23/02* (2006.01)
*G06F 17/18* (2006.01)

(52) U.S. Cl.
CPC ......... *G05B 23/0213* (2013.01); *G06F 17/18* (2013.01); *G05B 2223/06* (2018.08)

(58) Field of Classification Search
CPC .. G05B 23/0213; G05B 2223/06; G06F 17/18
See application file for complete search history.

(56) References Cited

U.S. PATENT DOCUMENTS

| 7,590,520 B2 * | 9/2009 | Nachmanson | G06F 11/3676 717/124 |
| 2011/0106509 A1 * | 5/2011 | Mercier | G06F 17/11 703/2 |

OTHER PUBLICATIONS

International Search Report for PCT/JP2021/025164 mailed on Sep. 21, 2021.

(Continued)

*Primary Examiner* — Gary Collins
(74) *Attorney, Agent, or Firm* — IPUSA, PLLC (57) ABSTRACT

A system optimal control technique with accuracy guarantee that enables high-speed calculations is provided. One aspect of the present invention is related to a system optimal control device including a graph converting unit configured to convert, based on an upper bound of an probability of arrival from an initial state to a final state of a stochastic game representing system information, the stochastic game into a flow analysis graph, a path selecting unit configured to select a path having a maximum width among paths from each state node to a final state node in the converted flow analysis graph, a width of each of the paths being defined as a minimum weight of edges forming the path, and a convergence determining unit configured to determine conver- (Continued)

gence of the upper bound and a lower bound of the probability of arrival of the stochastic game based on information about the selected path.

7 Claims, 6 Drawing Sheets

(56) References Cited

OTHER PUBLICATIONS

Kelmendi, E., Kramer, J., Kretinsky, J., Weininger, M.: Value iteration for simple stochastic games: stopping criterion and learning algorithm. In: International Conference on Computer Aided Verification. pp. 623-642. Springer (2018).

Medhi, D., Ramasamy, K.: Network Routing: Algorithms, Protocols, and Architectures (Second Edition). Morgan Kaufmann Publishers (2017).

Marta Kwiatkowska, Gethin Norman, David Parker and Gabriel Santos. PRISM-games 3.0: Stochastic Game Verification with Concurrency, Equilibria and Time. In Proc. 32nd International Conference on Computer Aided Verification (CAV'20), Springer, 2020.

Hasanbeig, M., Abate, A., Kroening, D.: Cautious Reinforcement Learning with Logical Constraints. Proceedings of the 19th International Conference on Autonomous Agents and MultiAgent Systems, pp. 483-491 (2020).

Kelmendi, Edon et al., "Value Iteration for Simple Stochastic Games: Stopping Criterion and Learning Algorithm", [online], Apr. 13, 2018, [retrieval date Sep. 9, 2021], internet: <URL: https://arxiv.org/abs/1804.04901>entire text, all drawings.

McMahan, H. Brendan et al., "Bounded Real-Time Dynamic Programming: RTDP with monotone upper bounds and performance guarantees", Proceedings of the 22nd International Conference on Machine Learning, ACM, Aug. 7, 2005, pp. 569-576 entire text, all drawings.

\* cited by examiner

| model | N | #states | NON-PATENT DOCUMENT 1 Ver.1 | | NON-PATENT DOCUMENT 1 Ver.2 | | NON-PATENT DOCUMENT 1 + Rein. Learn. | | | PROPOSED METHOD | |
|---|---|---|---|---|---|---|---|---|---|---|---|
| | | | itr | time | itr | time | itr | visit% | time | itr | time |
| mdsm | 3 | 62245 | 121 | 3 | 121 | 4 | 17339 | 49.3 | 15 | 120 | 5 |
| | 4 | 335211 | 125 | 15 | 125 | 47 | 91301 | 42.1 | 86 | 124 | 38 |
| cloud | 5 | 8842 | 7 | 7 | 7 | 1 | 167 | 6.9 | 14 | 7 | <1 |
| | 6 | 34954 | 11 | 177 | 11 | 5 | 41 | 0.6 | 3 | 11 | <1 |
| | 7 | 139402 | 11 | 19721 | 11 | 62 | 41 | 0.2 | 4 | 11 | 5 |
| teamform | 3 | 12475 | 2 | <1 | 2 | <1 | 972 | 49.0 | 137 | 2 | <1 |
| | 4 | 96665 | 2 | <1 | 2 | <1 | 4154 | 34.6 | 9603 | 2 | <1 |
| | 5 | 907993 | 2 | <1 | 2 | <1 | | | TO | 2 | <1 |
| investor | 50 | 211321 | 441 | 184 | 441 | 249 | | | TO | 364 | 48 |
| | 100 | 807521 | 801 | 3318 | | OOM | | | TO | 688 | 736 |
| manyECs | 500 | 1004 | 6 | 7 | 6 | 7 | | | TO | 5 | <1 |
| | 1000 | 2004 | 6 | 51 | 6 | 51 | | | TO | 5 | <1 |
| | 5000 | 10004 | | SO | | SO | | | TO | 5 | <1 |

SYSTEM OPTIMAL CONTROL DEVICE, SYSTEM OPTIMAL CONTROL METHOD, AND PROGRAM

TECHNICAL FIELD

The present disclosure relates to a system optimal control device, a system optimal control method, and a program.

BACKGROUND ART

In various technical fields, optimal control techniques are available. For example, in the management of a smart grid of electric power, power supply and demand are optimized according to a supply and demand situation in the electrical grid. Optimal control techniques are also used in computer network router switching, condition determination in automated driving, unmanned aerial vehicle (UAV) control, domain name system (DNS) attack prevention, and the like.

Many of these real systems typically have stochastic elements and can be modeled as stochastic games. For example, in the smart grid, when the weather changes, a power generation situation changes and a system model (a stochastic game) changes. Therefore, it is necessary to recalculate the optimal power distribution strategy for the changed stochastic game.

In such an optimal control technique, an approximate optimal strategy is actually used because it is difficult to calculate a true optimal control at high speed with known techniques. The value iteration method for calculating a lower bound of the probability of arrival to a final state in the stochastic game is known as an optimal control method for the stochastic game. In the value iteration method, the strategy estimation and the update of the lower bound of the probability of arrival are alternately repeated, and it is known that the lower bound of the probability of arrival converges to a true value.

Additionally, the bounded value iteration is known as an optimal control method with accuracy guarantee. The bounded value iteration method guarantees accuracy by calculating the upper bound of the probability of arrival to the final state simultaneously in addition to calculating the lower bound, which is what the ordinary value iteration method does. The bounded value iteration method guarantees that both the lower bound and upper bound of the probability of arrival converge to true values, but it requires more complex calculations than the usual value iteration method to guarantee the convergence of the upper bound, and it is known that it is difficult to perform the calculations at high speed.

RELATED ART DOCUMENTS

Non-Patent Documents

[Non-Patent Document 1] Kelmendi, E., Kramer, J., Kretinsky, J., Weininger, M.: Value iteration for simple stochastic games: stopping criterion and learning algorithm. In: International Conference on Computer Aided Verification. pp. 623-642. Springer (2018)

[Non-Patent Document 2] Medhi, D., Ramasamy, K.: Network Routing: Algorithms, Protocols, and Architectures (Second Edition). Morgan Kaufmann Publishers (2017)

[Non-Patent Document 3] Marta Kwiatkowska, Gethin Norman, David Parker and Gabriel Santos. PRISM-games 3.0: Stochastic Game Verification with Concurrency, Equilibria and Time. In Proc. 32nd International Conference on Computer Aided Verification (CAV'20), Springer, 2020

[Non-Patent Document 4] Hasanbeig, M., Abate, A., Kroening, D.: Cautious Reinforcement Learning with Logical Constraints. Proceedings of the 19th International Conference on Autonomous Agents and MultiAgent Systems, pp. 483-491 (2020)

SUMMARY OF THE INVENTION

Problems to be Solved by Invention

The problem to be solved of the present disclosure is to provide a system optimal control technique with accuracy guarantee that enables high-speed calculations.

Means to Solve Problems in order to solve the above-described problem, one aspect of the present invention relates to a system optimal control device including a graph converting unit configured to convert, based on an upper bound and lower bound of an probability of arrival from an initial state to a final state of a stochastic game representing system information, the stochastic game into a weighted graph, a path selecting unit configured to select a path having a maximum width among paths from each state node to a final state node in the converted weighted graph, a width of each of the paths being a minimum weight of edges constituting the path, and a convergence determining unit configured to determine convergence of the upper bound and lower bound of the probability of arrival of the stochastic game based on information about the selected path.

Effect of Invention

According to the present disclosure, a system optimal control technique with accuracy guarantee that enables high-speed calculations can be provided.

EMBODIMENT FOR CARRYING OUT THE INVENTION in the following embodiment, a system optimal control device that determines the upper bound of the probability of arrival to a final state of a stochastic game is disclosed.
[Stochastic Game]

Figure 1:
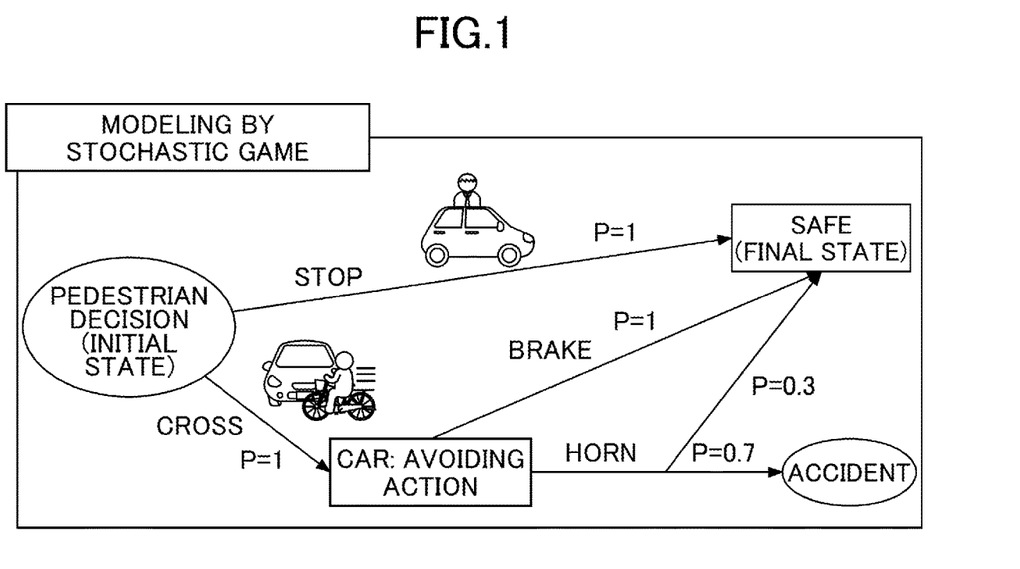
FIG. 1 is a schematic diagram illustrating an example stochastic game.

First, with reference to FIG. 1 and FIG. 2, a stochastic game for a system optimal control device according to one embodiment of the present disclosure will be described. FIG. 1 is a schematic diagram illustrating the stochastic game.

In the illustrated stochastic game, there are two players of a pedestrian trying to cross a crosswalk and a driver of a moving car, and a state stochastically transitions according to each player's action. The purpose is for the driver to pass the crosswalk without causing an accident regardless of an action of the pedestrian.

Thus, in the illustrated stochastic game, in an initial state "a pedestrian decision", the pedestrian decides whether to "cross" the crosswalk or "stop" at the crosswalk. If the pedestrian selects "stop", a final state "safe" is reached from the initial state.

If the pedestrian selects "cross", a state transitions from the initial state to a next state "car: avoiding action", and in that state, the driver decides whether to apply the "brake" to stop the car or to sound a "horn" to prevent the pedestrian from crossing. If the driver selects "brake", the final state "safe" is reached from that state. If the driver selects "horn", the state transitions to the final state "safe" with a 0.3 probability, and the state transitions to a next state "accident" with a 0.7 probability. In this case, the optimal control for driving the car indicates the driver's action selection that maximizes the probability of arrival to the aimed final state, regardless of the pedestrian selection. Therefore, here, the control policy of selecting "brake" in the state "car: avoiding action" is optimal. For example, in a smart grid, a system environment may be weather or the like, and a system controller may be a power company. Additionally, in autonomous driving, the system environment may be a road condition or the like, and the system controller may be a vehicle to be driven.

The present embodiment assumes a two-person game of a pedestrian and a driver, but more generally, the pedestrian may be regarded as the system environment and the driver may be regarded as the system controller. That is, the system optimal control device according to the embodiment described below controls an action of the system controller under the stochastic environment.

Formally, the stochastic game is defined as $M=(S, sI, 1, 0, A, Av, \delta)$. Here, S is a set of states and the union of respective players' sets of states. sI is the initial state, 1 is the final state, and 0 is a failure state. Additionally, A is a set of actions and Av(s) is a set of actions available in a state s. Furthermore, $\delta$ is a transition function of $\delta: S \times A \times S \rightarrow [0,1]$. A value of $\delta(s, a, s')$ being p indicates the probability of transitioning to the state s' if the action a is selected under the state s is p.

Figure 2:
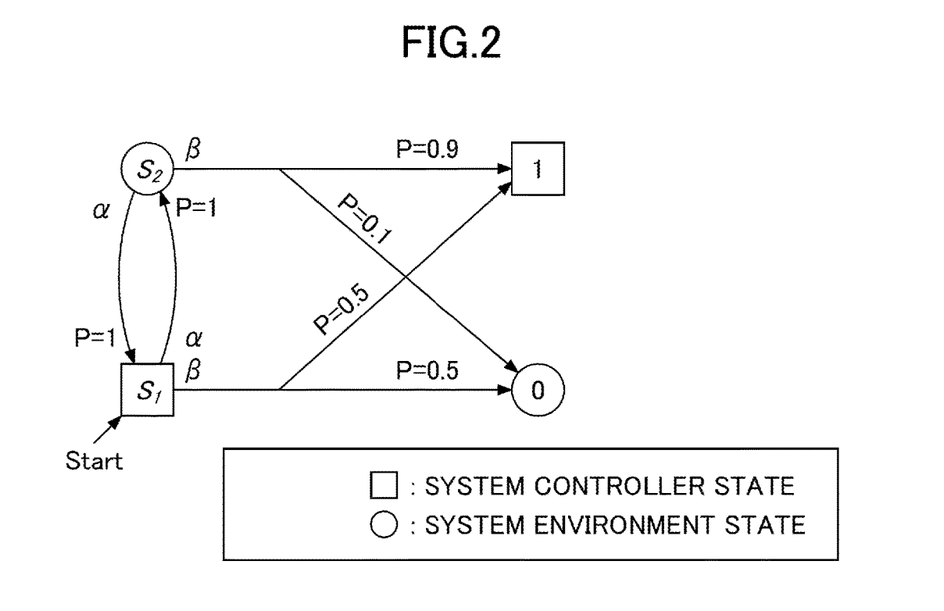
FIG. 2 is a transition diagram of the example stochastic game.

For example, as illustrated in FIG. 2, in a stochastic game in which there are two players, a system controller (□) and a system environment (O), the system controller selects its action to maximize the probability of arriving at the final state, and the system environment selects its action to minimize the probability of arriving at the final state.

In the illustrated embodiment, the system controller selects an action $\alpha$ or $\beta$ in the initial state sI. If the system controller selects $\alpha$, the state transitions from the initial state sI to a next state s2 with a probability 1, and if the system controller selects $\beta$, the state transitions from the initial state sI to the final state 1 with a probability 0.5 and to the failure state 0 with a probability 0.5, and the stochastic game ends without the system environment performing an action.

With respect to the above, the system environment selects the action $\alpha$ or $\beta$ in the state s2. If the system environment selects $\alpha$, the state transitions from the state s2 to the initial state sI with a probability 1, and if the system environment selects $\beta$, the state transitions from the state s2 to the final state 1 with a probability 0.9 and to the failure state 0 with a probability 0.1, and the stochastic game ends.

The reachability problem in such a stochastic game is a problem of calculating or approximating a function $V: S \rightarrow [0,1]$, and $V(s)$ is defined as a probability of reaching the final state 1 from the state s if two players continue to make an optimal selection (hereinafter referred to as the probability of arrival). Here, there is no known polynomial time algorithm for solving the reachability problem in the stochastic game.
[System Optimal Control Device]

Figure 3:
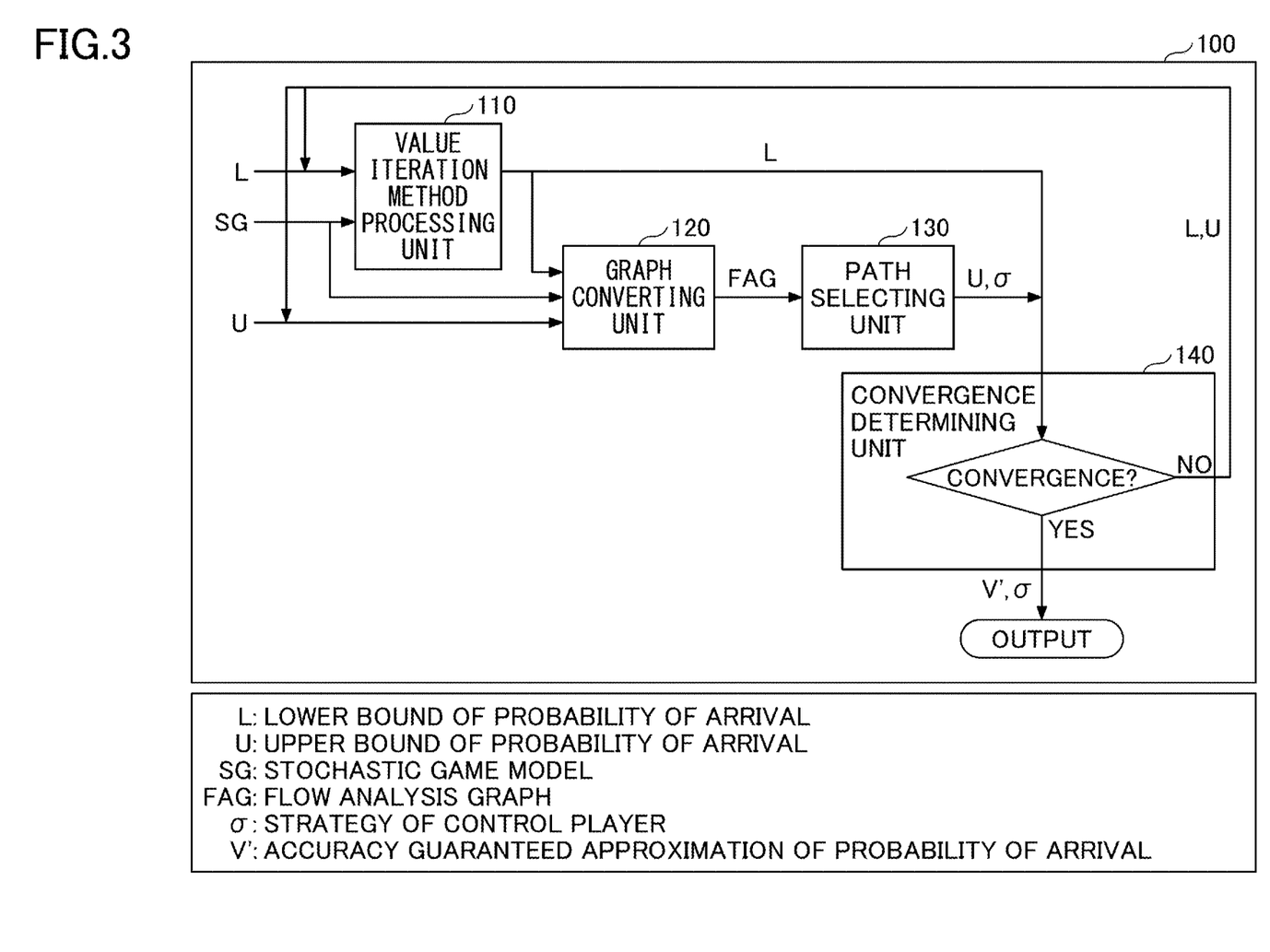
FIG. 3 is a block diagram illustrating a functional configuration of a system optimal control device according to one embodiment of the present disclosure.

Next, the system optimal control device according to one embodiment of the present disclosure will be described with reference to FIGS. 3 to 7. FIG. 3 is a block diagram illustrating a functional configuration of the system optimal control device according to one embodiment of the present disclosure.

As illustrated in FIG. 3, a system optimal control device 100 includes a value iteration method processing unit 110, a graph converting unit 120, a path selecting unit 130, and a convergence determining unit 140. When the system optimal control device 100 accepts an upper boundary value (an upper bound) U and a lower boundary value (a lower bound) L of the probability of arrival and a stochastic game model SG, the system optimal control device 100 asymptotically approximates the probability of arrival by using the upper bound and the lower bound of the probability of arrival.

The value iteration method processing unit 110 updates the lower bound of the probability of arrival according to the value iteration method. Specifically, the value iteration method processing unit 110 updates the lower bound L of the probability of arrival from each state to the final state in the stochastic game SG according to the known value iteration method for the given lower bound L of the probability of arrival and the stochastic game SG. In the following and in FIG. 5, the lower bound before the update performed by the value iteration method processing unit 110 is represented as L and the lower bound after the update is represented as L'.

Figure 4:
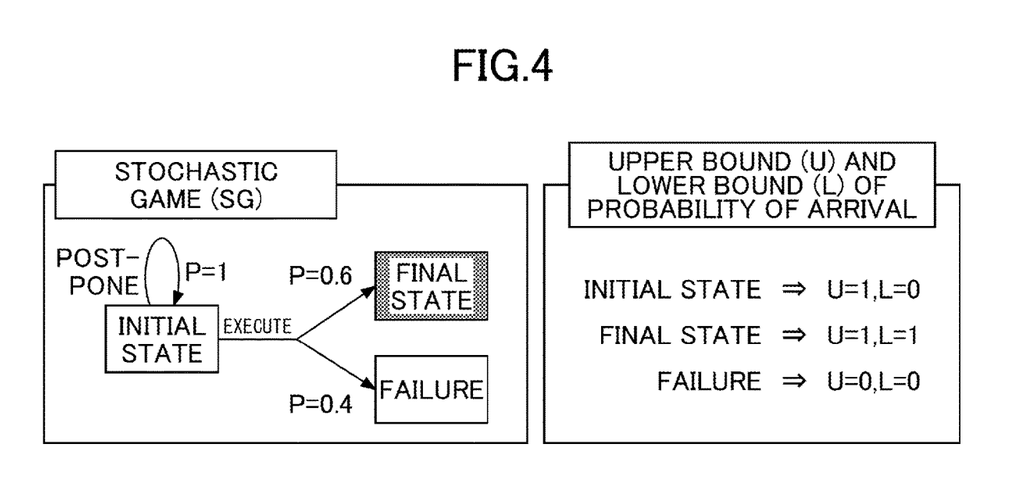
FIG. 4 is a schematic diagram illustrating a system optimal control process according to one embodiment of the present disclosure.
Figure 5:
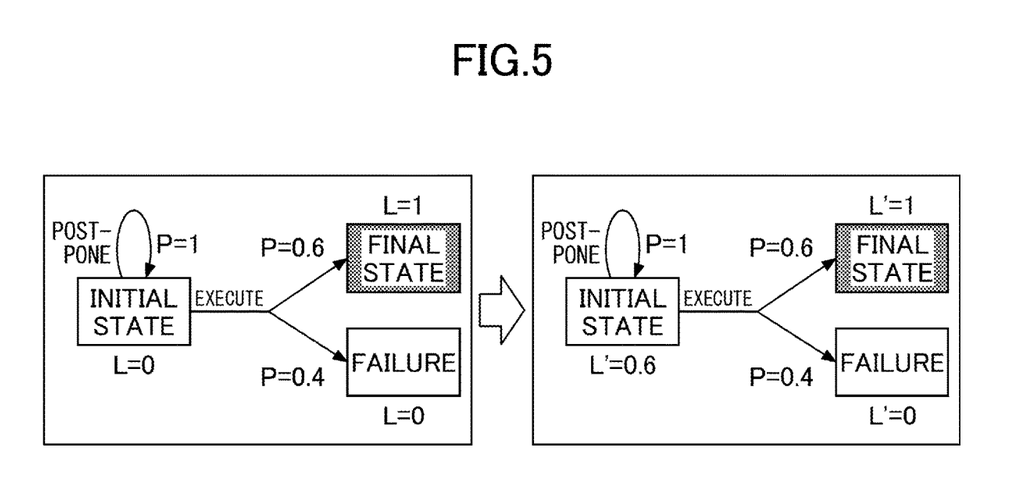
FIG. 5 is a schematic diagram illustrating the system optimal control process according to one embodiment of the present disclosure.

For example, it is assumed that the stochastic game SG and an upper bound U and the lower bound L of the probability of arrival are given as illustrated in FIG. 4. Here, the upper bound U and lower bound L of the probability of arrival are U=1, L=0 for the initial state, U=1, L=1 for the final state, and U=0, L=0 for the failure state. For convenience, the probability of arrival from the final state is set to 1.

If "postpone" is selected in the initial state, the state remains in the initial state with a probability 1, and if "execute" is selected, the state transitions to the final state with a probability 0.6 and to the failure state with a probability 0.4. In the stochastic game SG, all states are for a control player, and such a stochastic game is specifically referred to as a Markov decision process. The control player aims to maximize the probability of arriving at the final state during the game. For example, in the illustrated specific example, the optimal action of the control player in the initial state is "execute". This is because the state does not arrive at the final state by selecting "postpone" in the initial state. In this example, the probability of arrival from the initial state is 0.6 and the probability of arrival from the failure state is 0.

The value iteration method processing unit 110 updates the value of the lower bound L for each state as described below. For example, for the initial state, the value iteration method processing unit 110 performs the following calculations. First, an expected value of the lower bound L that is obtained after one transition under respective selectable actions is determined. As illustrated in the left part of FIG. 5, in the initial state, the control player can select "postpone" or "execute". If "postpone" is selected, the expected value of L that is obtained after one transition is calculated as L (the initial state)×1=0, because a state to be reached after one transition is the initial state with a probability 1. Similarly, if "execute" is selected, the expected value of L that is obtained after one transition is calculated as L (the final state)×0.6+L (the failure)×0.4=1×0.6+0×0.4=0.6. Among the values calculated as described, the largest value is used as the updated lower bound L'. In this example, the expected value of 0.6 obtained when "execute" is selected is maximum. Thus, as illustrated in the right part of FIG. 5, the value of the updated lower bound L' in the initial state is 0.6.

The updated lower bound L' is passed to the convergence determining unit 140. Here, in this example, L' converges to the true value of the lower bound after one update, but more generally, L' is any value that is not below L and that is not above the probability of arrival. The value iteration method asymptotically causes the lower bound to approach the true probability of arrival by repeating substantially the same calculation by using the updated lower bound L' as a new input.

Here, the value iteration method is well known and further details are omitted.

The graph converting unit 120 converts the stochastic game into a weighted graph called a flow analysis graph (FAG) based on the upper bound and lower bound of the probability of arrival from the initial state to the final state of the stochastic game representing system information.

Specifically, the graph converting unit 120 first converts the stochastic game SG into a Markov decision process MDP by using the stochastic game SG and the lower bound L. Because this conversion method is known (see, e.g., Non-patent Document 1), details are omitted. Additionally, in the example of FIG. 4, this conversion is not performed because the stochastic game SG is given as a Markov decision process from the beginning.

The graph converting unit 120 then converts the Markov decision process MDP into a flow analysis graph FAG in the following manner.

1) The node set of the flow analysis graph FAG is the state set of the Markov decision process MDP.

2) The FAG has an edge from a node A to a node B if and only if a transition can be performed from a state A to a state B (one transition) by an action in the Markov decision process MDP. For example, in the example of FIG. 4, if "execute" is selected in the initial state, the FAG has an edge from the initial state node to the failure node because a transition can be performed from the initial state to the failure state.

3) The weight of each edge in the FAG is the expected value of the upper bound U obtained after an action defining the presence of the edge is performed in the Markov decision process MDP. For example, in the example of FIG. 4, an action that enables a transition from the initial state to the failure state is "execute", and the expected value of the upper bound U obtained after "execute" is calculated as U (the final state)×0.6 U (the failure)×0.4=1×0.6 0×0.4=0.6. Therefore, the weight of the FAG edge "initial state to failure" is set to 0.6.

4) In addition, each edge of the FAG is labeled with an action name that defines the presence of the edge. For example, in the example of FIG. 4, the FAG edge "initial state to failure" is labeled with "execute".

Figure 6:
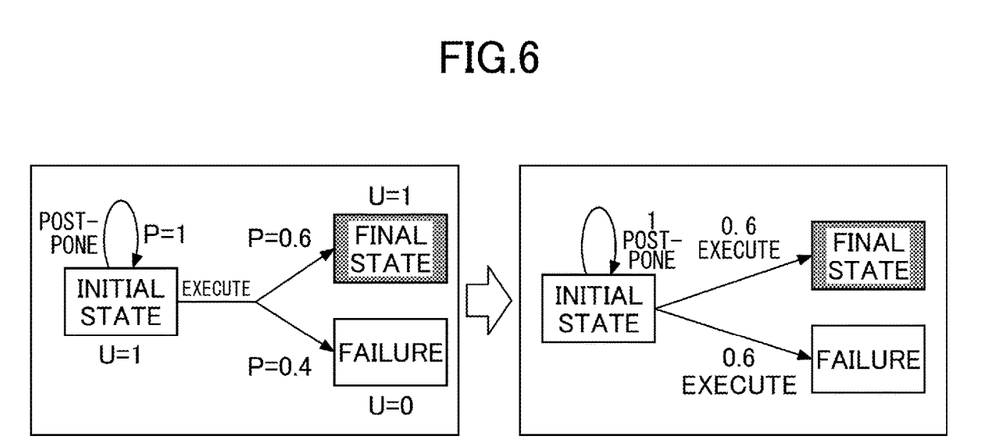
FIG. 6 is a schematic diagram illustrating the system optimal control process according to one embodiment of the present disclosure.

According to the procedure, the graph converting unit 120 generates the flow analysis graph FAG (on the right side of FIG. 6) from the stochastic game SG and the upper bound U and lower bound L of the probability of arrival (on the left side of FIG. 6) and passes them to the path selecting unit 130, as illustrated in FIG. 6.

The path selecting unit 130 selects a path having the maximum width among paths (node transition sequences) from each state node to a final state node in the converted flow analysis graph FAG. Here, the width of each path is defined as the minimum weight of the edges constituting the path. This corresponds to the widest path problem with respect to the weighted graph. That is, it can be formulated as a problem of determining, when two nodes are given as a start point and an end point, the maximum width path or the width from the start point to the end point, and can be solved by the Dykstra's method (see, e.g., Algorithm 2.8 in Non-Patent Document 2). Here, because the Dykstra's method is a well-known algorithm, details are omitted. In the following and in FIG. 7, the upper bound before the update performed by the path selecting unit 130 is represented as U and the upper bound after the update is represented as U'.

Figure 7:
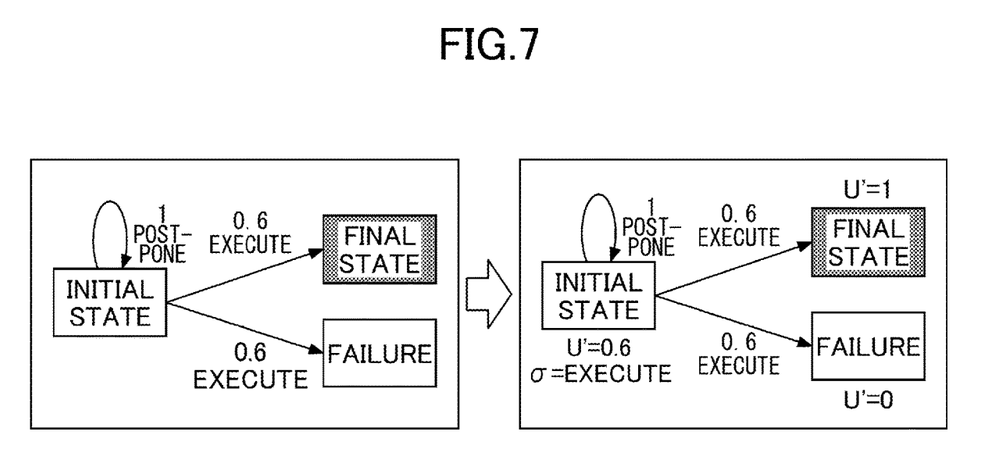
FIG. 7 is a schematic diagram illustrating the system optimal control process according to one embodiment of the present disclosure.

The path selecting unit 130 determines the maximum width path from each node to the node of the final state of the flow analysis graph, and as illustrated in FIG. 7, sets the width of the determined maximum width path as the updated upper bound U' and an action corresponding to the first edge of the determined maximum width path as a strategy σ. For example, the maximum width path from the initial state to the final state is calculated by the Dykstra's method as the path "the initial state→the final state". Thus, the value of U' in the initial state is 0.6 and the value of σ is "execute". The updated upper bound U' and the strategy σ are passed to the convergence determining unit 140.

By solving the maximum path width problem for the flow analysis graph converted from the stochastic game in such a way, the update of the upper bound of the probability of arrival in which the convergence to the true value is guaranteed and the generation of the strategy can be performed.

The convergence determining unit 140 determines the convergence of the upper bound and lower bound of the probability of arrival in the stochastic game SG. Specifically, when a difference between the lower bound L' acquired from the value iteration method processing unit 110 and the upper bound U' acquired from the path selecting unit 130 is less than or equal to a predetermined threshold, the convergence determining unit 140 may determine that the upper bound and the lower bound have converged. If determined as such, any value V' that is not below the lower bound L' and that is not above the upper bound U' (typically the lower bound L', the upper bound U' or the average thereof) is output as an approximation of the probability of arrival and the strategy σ is output as the optimal control strategy.

If the upper bound has not converged, the convergence determining unit 140 instructs the value iteration method processing unit 110, the graph converting unit 120, and the path selecting unit 130 to perform the update by using the upper bound U' and the lower bound L' as new inputs of the upper bound and lower bound. For example, the graph converting unit 120 may reconvert the stochastic game into the flow analysis graph based on the updated upper bound U' and L" that is obtained by the value iteration method processing unit 110 updating the updated lower bound L'. Additionally, the path selecting unit 130 may re-select a path having the maximum width among paths from each state node to the final state node in the flow analysis graph reconverted in such a way.

According to the system optimal control process described above, results obtained by a simulation indicate that the accuracy guaranteed upper bound and lower bound of the probability of arrival can be calculated up to about 1000 times faster than the calculation speed of the bounded value iteration method with the accuracy guarantee.

Figure 8:
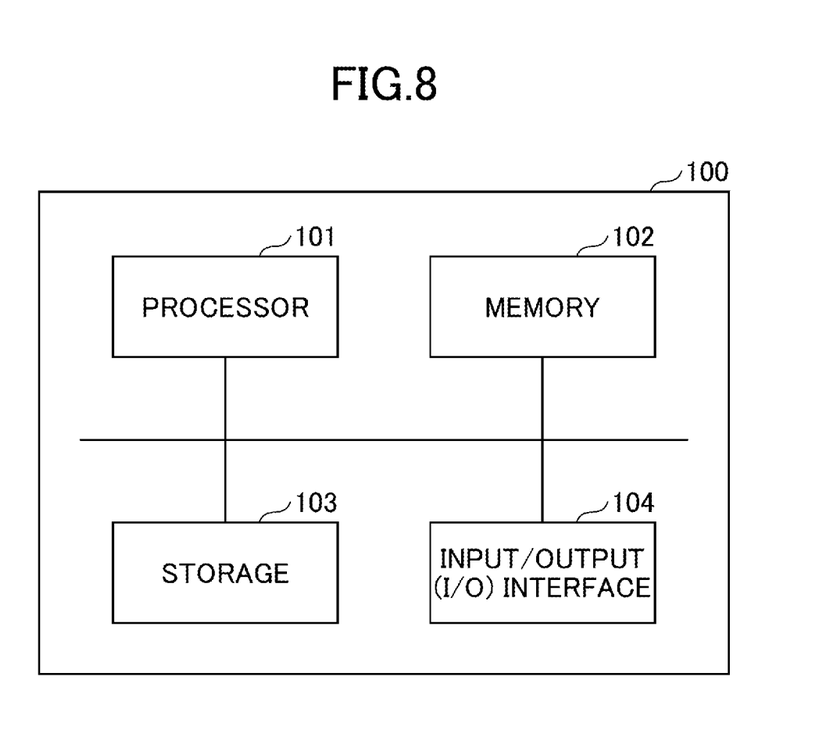
FIG. 8 is a block diagram illustrating a hardware configuration of the system optimal control device according to one embodiment of the present disclosure.

Here, the system optimal control device 100 may have a hardware configuration of, for example, a processor 101 such as a central processing unit (CPU), a memory 102 such as a random access memory (RAM), a flash memory, and the like, a storage 103, and an input/output (I/O) interface 104, as illustrated in FIG. 8.

The processor 101 performs various processes of the system optimal control device 100 described later.

The memory 102 stores various data and programs of the system optimal control device 100 and functions as working memory particularly for working data, running programs, and the like. Specifically, the memory 102 stores programs and the like loaded from the hard disk 103 for executing and controlling various processes described later, and functions as a working memory while the program is being executed by the processor 101.

The hard disk 103 stores various data and programs of the system optimal control device 100.

The I/O interface 104 accepts commands and input data from a user, displays and replays output results, and is an interface for inputting and outputting data to and from external devices. For example, the I/O interface 104 may be a device for inputting and outputting various data of a universal serial bus (USB), a communication line, a keyboard, a mouse, a display, a microphone, a speaker, and the like.

However, the system optimal control device 100 according to the present disclosure is not limited to the hardware configuration described above and may have any other suitable hardware configuration. For example, one or more of the various processes performed by the system optimal control device 100 may be implemented by a processing circuit or electronic circuit wired to achieve the process.

Figure 9:
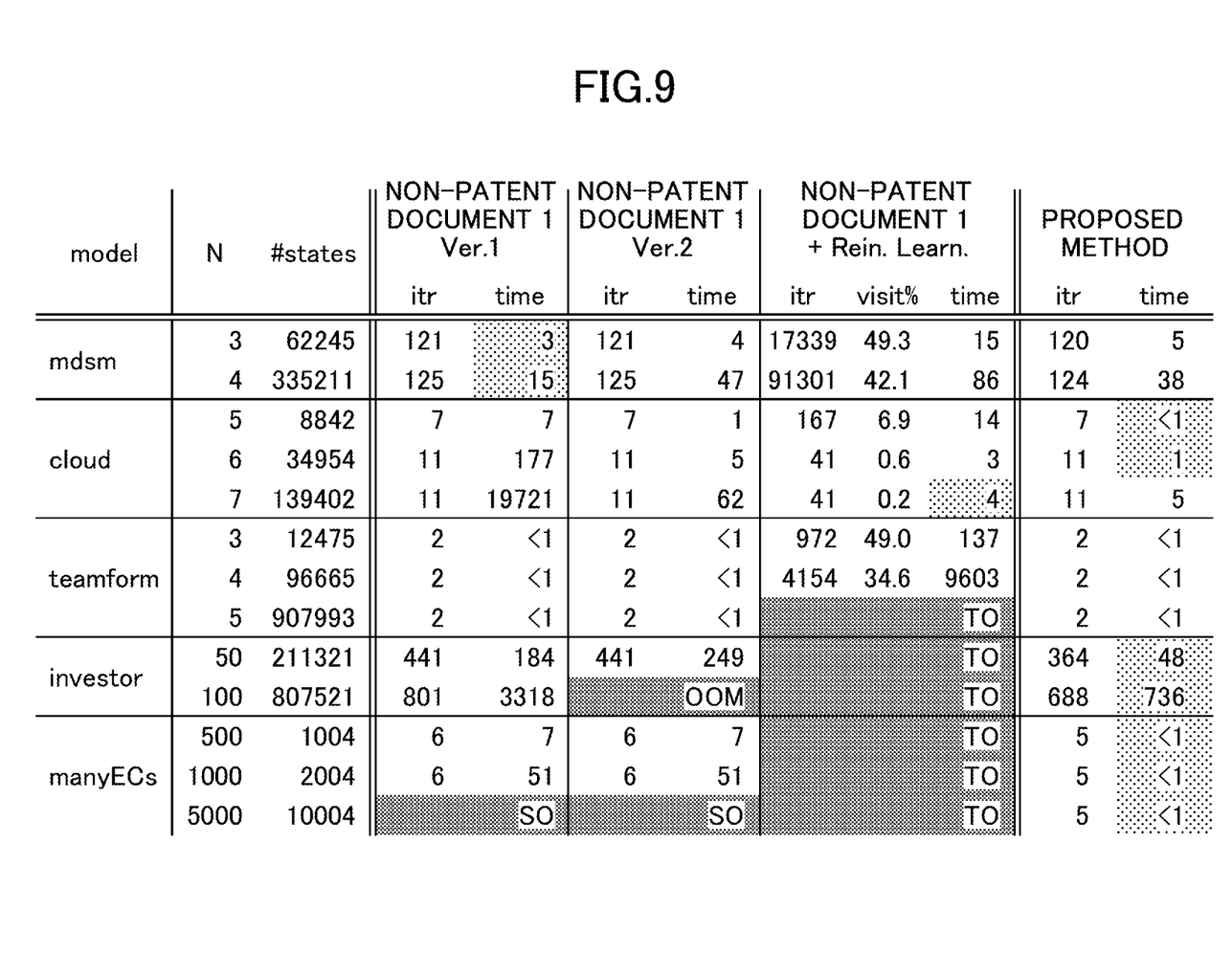
FIG. 9 is a diagram illustrating a comparison between a system optimal control according to one embodiment of the present disclosure and an existing method.

FIG. 9 is a diagram illustrating a comparison between the system optimal control process according to one embodiment of the present disclosure and existing methods. Here, N indicates a parameter, #states indicates the number of states, itr indicates the number of upper/lower bound updates, visit % indicates the state search rate, time indicates the calculation time, TO indicates the time out (6 hours), SO indicates stack overflow, and OOM indicates out of memory. Each program is calculated with the probability of arrival to the final state being less than or equal to error 0.0001%. Additionally, the shading on the numerical values in FIG. 9 indicates that the calculation is fastest for the corresponding instance.

By using PRISM-GAMES (Non-Patent Document 3), which is one of the representative formal verification software, the performance of the existing methods (Non-Patent Document 1) and the performance of the system optimal control (the proposed method) in the present disclosure were compared. Four benchmarks provided in PRISM-GAMES and one newly created benchmark were used as models to be verified. As illustrated in FIG. 9, the proposed method has achieved higher speed than the existing methods (Non-Patent Document 1) for more than half of the instances and a stable calculation speed for all instances. As described, the superiority of the proposed method was confirmed.

Application Example

In the following, an application example of the system optimal control of the present disclosure will be described.
[Verification of a Game Design]

In one example of the disclosure, the system optimal control is used for verification performed when a new element (a character, a scenario, and the like) is added in a game such as a social game. In order for a game to attract users, the "strength" of the new character, the difficulty level of the new scenario, and the like are required to be at an appropriate level. For example, if the new character is weaker than an existing character, there is no appeal, while if the new character is too excessively strong, the existing characters become obsolete faster, which leads to user churn (because obtaining the character often requires payment). Here, the strength of the character can be quantified, for example, as an expected value of a score obtained when playing a scenario using that character.

In the proposed method (the system optimal control of the present disclosure), for example, the strength of the character that is quantified as described above can be approximately calculated with accuracy assurance. This can verify whether the strength of the new character is at an appropriate level. Additionally, it is assumed that game developers repeat the verification and the performance adjustments of the character based on the results of the verification to design the new character having an appropriate strength. Therefore, the high-speed performance of the proposed method can shorten the delivery time.
[Verification of Safety in Autonomous Driving]

In one embodiment of the present disclosure, the system optimal control is used to verify safety in autonomous driving. Because the value iteration method (VI), which is the basis of the proposed method (the system optimal control in the present disclosure), is a basic technique in path planning and the like, the replacement by the proposed method (the system optimal control in the present disclosure) can be conceivable in existing use scenes.

As an example, "safe reinforcement learning" (for example, Non-Patent Document 4) can be considered. Reinforcement learning is a method of the optimal control calculation in which various control inputs are tried and the result is used as a reference in order to asymptotically obtain a better control policy. Reinforcement learning usually does not guarantee safety in the process of trying various control inputs (when applied to autonomous driving, for example, control inputs such as collision with obstacles can also be tried). Safe reinforcement learning is a method of calculating a control policy safely and efficiently by calculating safe control inputs in the current state in advance and allowing reinforcement learning to try the control inputs within that range. Here, the value iteration method (VI) is used to calculate the safe control inputs.

Because the value iteration method (VI) can calculate only the lower bound of safety, there is a possibility that all safe inputs cannot be detected. The accuracy guaranteed calculation of the proposed method (the system optimal control in the present disclosure) can avoid missing safe control inputs and the performance improvement of reinforcement learning can be expected. Additionally, the method described in Non-Patent Document 4, for example, requires what is called online safety verification, in which the calculation of safe inputs is performed on the fly while reinforcement learning is performed, and thus the completion of the verification with high speed is essential. It is expected that the high-speed performance of the proposed method enhances its applicability to such an example.

[Others]

In one embodiment of the present disclosure, the system optimal control is used in navigation systems for real-time control in an unmanned aerial vehicle (UAV) (e.g., risk-avoidance action control). In the present embodiment, the proposed method calculates, with accuracy guarantee, for example, the maximum value of the probability of arriving at the destination while avoiding danger.

In one embodiment of the present disclosure, the system optimal control is used for task completion sequence optimal control of an automated production line for quality verification of industrial products and the like, in a quality verification system. In the present embodiment, the proposed method calculates, with accuracy guarantee, for example, the maximum value of the probability that an automated production line can complete a task.

In one embodiment of the present disclosure, the system optimal control is used in a financial trading system to determine an investment strategy that suggests the best timing to buy or sell financial products. In the present embodiment, the proposed method calculates, with accuracy guarantee, for example, the expected value of a profit obtained by buying or selling at the optimal timing.

In one embodiment of the disclosure, the system optimal control is used in a smart grid for distribution optimal control to provide a stable power supply even in weather and usage variations. In the present embodiment, the proposed method calculates, with accuracy guarantee, for example, the maximum value of the probability that power can be supplied as required for various weather and usage variations.

Although the embodiments of the invention have been described in detail above, the invention is not limited to the specific embodiments described above, and various modifications and alterations can be made within the scope of the subject matter of the invention described in the claims.

This international application is based on and claims priority to Japanese Patent Application No. 2020-115973, filed on Jul. 3, 2020, the entire contents of which are hereby incorporated herein.

DESCRIPTION OF THE REFERENCE NUMERALS 100 system optimal control device
110 value iteration method processing unit
120 graph converting unit
130 path selecting unit
140 convergence determining unit

The invention claimed is:

1. A system optimal control device comprising:
a processor; and
a memory storing program instructions that cause the processor to:
convert, based on an upper bound of a probability of arrival from an initial state to a final state of a stochastic game representing system information, the stochastic game into a flow analysis graph;
select a path having a maximum width among paths from an initial state node to a final state node in the converted flow analysis graph, a width of each of the paths being defined as a minimum weight of edges forming the path; and
determine convergence of the upper bound and a lower bound of the probability of arrival of the stochastic game based on information about the selected path.

2. The system optimal control device as claimed in claim 1, wherein the processor reconverts the stochastic game into a flow analysis graph based on an updated upper bound.

3. The system optimal control device as claimed in claim 2, wherein the processor selects a path having a maximum width among paths from the initial state node to the final state node in the reconverted flow analysis graph.

4. The system optimal control device as claimed in claim 1, wherein the program instructions further cause the processor to update the lower bound of the probability of arrival according to a value iteration method.

5. The system optimal control device as claimed in claim 1, wherein the processor selects, for each state node, a path having a maximum width among paths from the state node to the final state node.

6. A system optimal control method comprising:
converting, by a processor, based on an upper bound of a probability of arrival from an initial state to a final state of a stochastic game representing system information, the stochastic game into a flow analysis graph;
selecting, by the processor, a path having a maximum width among paths from an initial state node to a final state node in the converted flow analysis graph, a width of each of the paths being defined as a minimum weight of edges forming the path; and
determining, by the processor, convergence of the upper bound and a lower bound of the probability of arrival of the stochastic game based on information about the selected path.

7. A non-transitory computer-readable recording medium having stored therein a program for causing a computer to perform a process comprising:
converting, by a processor, based on an upper bound of a probability of arrival from an initial state to a final state of a stochastic game representing system information, the stochastic game into a flow analysis graph;
selecting, by the processor, a path having a maximum width among paths from an initial state node to a final state node in the converted flow analysis graph, a width of each of the paths being defined as a minimum weight of edges forming the path; and
determining, by the processor, convergence of the upper bound and a lower bound of the probability of arrival of the stochastic game based on information about the selected path.

* * * * *